(12) United States Patent
Fine

(10) Patent No.: US 8,124,244 B2
(45) Date of Patent: Feb. 28, 2012

(54) ZERO VOC OLEORESINOUS STAINS AND COATINGS FOR PRESTAIN APPLICATIONS

(76) Inventor: Harry M. Fine, Manchester, CT (US)

( * ) Notice: Subject to any disclaimer, the term of this patent is extended or adjusted under 35 U.S.C. 154(b) by 233 days.

(21) Appl. No.: 11/893,960

(22) Filed: Aug. 17, 2007

(65) Prior Publication Data
US 2009/0047530 A1 Feb. 19, 2009

(51) Int. Cl.
*B32B 29/00* (2006.01)
(52) U.S. Cl. ............ 428/535; 428/537.1; 427/325; 525/190; 524/313
(58) Field of Classification Search ............ 428/535, 428/537.1; 427/325; 525/190; 524/313
See application file for complete search history.

(56) References Cited

U.S. PATENT DOCUMENTS

| | | | | |
|---|---|---|---|---|
| 2,390,530 A | * | 12/1945 | Gerhart et al. | 524/313 |
| 3,098,834 A | * | 7/1963 | Jerabek | 524/364 |
| 5,693,715 A | * | 12/1997 | Kodali | 525/190 |
| 6,794,483 B2 | * | 9/2004 | Loza et al. | 528/306 |
| 6,854,669 B2 | * | 2/2005 | Anthony | 239/525 |
| 6,916,878 B2 | * | 7/2005 | Bremser et al. | 524/847 |

* cited by examiner

*Primary Examiner* — Leszek Kiliman
(74) *Attorney, Agent, or Firm* — Cantor Colburn LLP

(57) ABSTRACT

A composition for coating a building material such as an article of architectural lumber or the like includes dicyclopentadiene modified oil and an oleoresinous component having a high solids content mixed therewith. The oleoresinous component is free of volatile organic compounds (VOC). An article of architectural lumber includes a substrate (e.g., wood, fiberboard, paper, or the like) and a coating disposed thereon, the coating being a dicyclopentadiene modified oil and an oleoresinous component having a high solids content mixed therewith. The oleoresinous component has a high solids content and is free of VOC. A method of coating a building material includes the steps of preparing a composition of dicyclopentadiene modified linseed oil and an oleoresinous component having a high solids content that is free of VOC, applying the composition to the building material, and allowing the composition to dry into a hardened film on the building material.

28 Claims, No Drawings

ZERO VOC OLEORESINOUS STAINS AND COATINGS FOR PRESTAIN APPLICATIONS

TECHNICAL FIELD

The present invention relates generally to stains and coatings and, more particularly, to oleoresinous compositions that can be applied as stains and coatings to materials for use in building various types of products.

BACKGROUND OF THE INVENTION

Concerns for both the environment and worker health and safety have prompted almost every industry to explore novel and innovative technologies to reduce or eliminate volatile organic compounds (VOC) from their applications. Volatile organic compounds are organic chemicals that have sufficient vapor pressures under ambient conditions to significantly vaporize and enter the atmosphere. Common sources of VOC include compounds such as those used in dry cleaning and other cleaning processes, in painting and staining applications, and in the processing and use of materials for construction. Other sources of VOC can be found in the processing, dispensing, and use of petroleum fuels.

Although the specific definition can vary, a VOC is generally taken to be any volatile compound of carbon with the exception of carbon monoxide, carbon dioxide, carbonic acid, metal carbides, metal carbonates, and certain other carbon-containing compounds that have no or negligible photoreactivity under ambient atmospheric conditions. Some VOC having more than negligible photoreactivity react with nitrogen dioxides in the air to form ozone, which has been deemed to pose a health threat by causing or exacerbating respiratory problems. Some VOC emitted from paints, stains, varnishes, shellacs, other coating materials as well as plastics, carpets, and other building materials can pose a threat to persons in an indoor environment. Indoor VOC emission is often considered to be a factor in "sick building syndrome."

Commercial finishing operations typically apply large volumes of coating materials to various types of products. These products include, but are not limited to, furniture, raw and finished lumber, and architectural building materials (e.g., trims, moldings, cabinetry, flooring, and the like). These coating materials may be either water- or solvent-based, and VOC can be emitted from either.

The coating materials that are applied include paints, stains, varnishes, and the like. Each of these materials generally includes a solvent in which pigments (paints), dyes (paints and stains), and resin (varnish) are dissolved or suspended. These solvents are typically carbon compounds having considerable volatility (thus putting them into the VOC category), thereby making them subject to regulation or targets for elimination.

The paints, stains, varnishes, etc. as described above may also include VOC-containing binders. One particular type of VOC-containing binder commonly used is an alkyd-based material. Alkyds are typically manufactured from acid anhydrides (e.g., phthalic, maleic anhydride, and the like) and polyols (e.g., glycerol, pentaerythritol, and the like) and are modified with unsaturated vegetable oil. The unsaturated sites in the oil molecules oxidize, thereby causing polymerization or cross-linking. In the processing of alkyd-based compositions, specifically those in which alkyds are incorporated into paints, stains, varnishes, and the like, the alkyds are undesirably released into the atmosphere.

What is needed is a composition that can be applied to architectural building materials, such a composition having no VOC emissions but that exhibits suitable and desirable properties relating to covering, curing, hardness, and durability.

SUMMARY OF THE INVENTION

In one aspect, the present invention resides in a composition for coating a building material such as an article of architectural lumber or the like. The composition includes dicyclopentadiene modified oil and an oleoresinous component having a high solids content mixed therewith. This component can include a dye or a pigment to impart a color to the composition. The oleoresinous component mixed with the dicyclopentadiene modified oil is free of volatile organic compounds (VOC).

In another aspect, the present invention resides in an article of architectural lumber. An article of architectural lumber includes a substrate (e.g., wood, fiberboard, paper, or the like) and a coating disposed on the substrate. The coating is a dicyclopentadiene modified oil and an oleoresinous component having a high solids content mixed therewith. The oleoresinous component has a high solids content and is free of VOC.

In another aspect, the present invention resides in a method of coating a building material. This method includes the steps of preparing a composition of dicyclopentadiene modified linseed oil and an oleoresinous component having a high solids content that is free of VOC, applying the composition to the building material, and allowing the composition to dry into a hardened film on the building material.

Preferably, the dicyclopentadiene modified oil in any of the embodiments described herein is made with linseed oil.

One advantage of the present invention is that no VOC is released from the composition into the atmosphere. Both the dicyclopentadiene modified oil and the oleoresinous component mixed therewith are free of VOC so that upon application of the composition to a substrate (e.g., architectural lumber), the oil hardens into a film without the release of chemicals deemed harmful to the environment or humans.

DESCRIPTION OF THE PREFERRED EMBODIMENT

As used herein, the term "building material" refers to wood in all its forms (e.g., raw lumber, hardwood, softwood, plywood, fiberboard, engineered wood, and the like).

As used herein, the term "copolymer" refers to a material produced by the simultaneous polymerization of two or more dissimilar monomers.

As used herein, the term "oleoresinous" is used to describe a mixture of a resin and an oil extracted from a plant or a tree.

As used herein, the term "dicyclopentadiene" is used to describe the dimer of cyclopentadiene, which is derived from petroleum products such as coal tar and various oils. Cyclopentadiene dimerizes via a Diels-Alder reaction to produce the dicyclopentadiene dimer.

As used herein, the term "linseed oil" refers to a hydrocarbon material derived from vegetable sources and including glycerides of linolenic, linoleic, oleic, and saturated fatty acids. Linseed oil is a drying oil, which is an oil that, when applied as a thin film, readily absorbs oxygen from the air and polymerizes to form a relatively tough, elastic film.

As used herein, the term "iodine value" refers to the mass of iodine in grams that is consumed by 100 grams of a chemical substance. Because double bonds in fatty acids react with iodine, the iodine number is a determination of saturation of fatty acid.

As used herein, "volatile organic compound" and "VOC" refer to carbon-containing chemicals that have sufficient vapor pressures under ambient conditions to significantly vaporize and enter the atmosphere.

The present invention includes copolymers that are applied to various types of building materials. These copolymers generally comprise oleoresinous dicyclopentadiene modified linseed oil and are used to provide vehicles for formulations (compositions) of coating materials. The compositions can be applied to the various types of building materials as stains, varnishes, paints, and the like. Because the copolymers are oleoresinous oils, no volatile organic compounds (VOC) are emitted therefrom. Although the compositions are typically applied in factory settings, the present invention is not limited in this regard and as such the compositions may be applied by an end user outside of a factory setting (e.g., by a builder installing architectural trim during construction of a building).

In formulating the copolymer, dicyclopentadiene modified linseed oil is prepared by reacting dicyclopentadiene with linseed oil having an iodine value of greater than about 150. The dicyclopentadiene is added in increments to the oil with agitation and at a temperature of about 250 degrees C. to about 270 degrees C. The dicyclopentadiene de-dimerizes (cleaves into separate cyclopentadiene monomers) and reacts with the unsaturated sites of the linseed oil. The extent of the unsaturation of the linseed oil is determined by the iodine value. The reaction of the cyclopentadiene with the unsaturated sites of the linseed oil proceeds by the Diels-Alder reaction. Although the oil is described herein as being linseed oil, the present invention is not limited in this regard as other drying oils (such as tung, perilla, soya, otitica, sunflower, safflower, castor, and fish oils) may be used in place of or in combination with the linseed oil. In particular, other drying oils can be used to modify the rheological properties of the linseed oil-based compositions of the present invention.

Once the dicyclopentadiene modified linseed oil is prepared, a high solids content oleoresin is incorporated therein to form an oleoresinous dicyclopentadiene modified linseed oil copolymer that serves as the vehicle for the stain, varnish, or paint. A high solids content oleoresin is one in which the total amount of solids is about 50 wt. % to about 100 wt. %, preferably about 75 wt. % to about 100 wt. %, and more preferably about 90 wt. % to about 100 wt. %. When the high solids content oleoresin is less than 100 wt. % solids, the solids portion may be diluted in a non-VOC solvent such as tert-butyl acetate, a cyclic siloxane, 2-chlorobenzotrifluoride, or the like, or any other solvent that is photochemically non-reactive. When the oleoresin is less than 100% solids and diluted in a solvent, the viscosity of the oleoresin may cause it to be heated to facilitate its addition to the dicyclopentadiene modified linseed oil. When the resin is 100% solids (e.g., in the form of a powder, flake, chip, or the like), it is melted directly into the dicyclopentadiene modified linseed oil.

The oleoresin itself can be cumarone (also known as benzofuran), which is a heterocyclic aromatic organic compound having the formula $C_8H_6O$. Other materials that may be used in addition to or in place of the cumarone include, but are not limited to, 100% solids resin modifiers such as hydrocarbons, shellacs, maleic anhydride and/or maleic acid, polymers, vegetable oils, and the like. The present invention is not limited in this regard, however, as other materials may be used.

In one composition of the present invention, a stain is formulated by solublizing or suspending a dye in the oleoresinous dicyclopentadiene modified linseed oil without additional binder or solvent so that the oleoresinous dicyclopentadiene modified linseed oil functions both as the binder and the solvent. Upon drying, the dye imparts color to a hardened film formed by the oleoresinous dicyclopentadiene modified linseed oil.

In another composition of the present invention, a paint may be formulated with the oleoresinous dicyclopentadiene modified linseed oil. Such a paint includes the oleoresinous dicyclopentadiene modified linseed oil as the vehicle with pigments and/or dyes incorporated there. In paint, the preferred additive is pigment, which is generally in the form of a powder that is insoluble in the oleoresinous dicyclopentadiene modified linseed oil but is dispersed therein to form a suspension. When the composition of the present invention is a paint, a dispersant is typically included to facilitate the dispersion and the wetting of the pigment in the oleoresinous dicyclopentadiene modified linseed oil.

The amount of pigment in the oleoresinous dicyclopentadiene modified linseed oil to form a paint is about 10 wt. % to about 90 wt. %, preferably about 10 wt. % to about 50 wt. %, and more preferably about 10 wt. % to about 40 wt. %. Upon drying, the pigment imparts color (and likely an opaque quality) to a hardened film of oleoresinous dicyclopentadiene modified linseed oil.

In any embodiment, the oleoresinous dicyclopentadiene modified linseed oil may include materials in addition to the dyes, resins, or pigments. Such materials include, but are not limited to, leveling agents, drying agents (e.g., naphthenates, rare earth oxides and/or other rare earth materials, and the like), fillers, film forming agents, agents that absorb, block, or filter ultraviolet radiation (to protect from fade), stabilizers, preservatives, surfactants, thickening agents, combinations of the foregoing, and the like. Preferably, a rare earth material is included in the composition to effect the oxidation of the composition.

Whether the composition of the present invention is a stain, varnish, paint, or some other type of material, it may be applied to a substrate using any suitable means to form a film. The substrate is preferably wood-based, although the present invention is not limited in this regard as materials other than wood may be used as substrates. Suitable methods for applying the composition include, but are not limited to, brushing, rolling, spraying, roller coating, curtain coating, dipping, combinations of any of the foregoing, and the like. Preferably, the composition is sprayed onto the substrate. If the composition is a stain, excess composition may be removed from the substrate. Also, if the composition is a stain or a paint, a composition of the present invention in which varnish is incorporated into the oleoresinous dicyclopentadiene modified linseed oil may be applied as a topcoat.

In the present invention, the compositions are preferably applied to architectural lumber in a factory setting using suitable pumping and atomizing equipment. The present invention is not limited to application of the compositions in a factory setting, however, as the compositions may be applied at the points at which articles into which the compositions are incorporated are assembled or used. Architectural lumber includes, but is not limited to, trim, molding, cabinetry, flooring, siding, doors, decking materials, and the like. Other things that the coating compositions may be applied to include, but are not limited to, indoor furniture, outdoor furniture, artwork, framing material, fencing, tool handles, musical instruments, paper products, and the like.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A composition for coating a building material, said composition comprising:
   a dicyclopentadiene modified oil comprising a reaction product of cyclopentadiene monomers and unsaturated sites of an oil; and
   an oleoresin selected from the group consisting of benzofuran, maleic anhydride, maleic acid, and combinations of the foregoing; and
   wherein said composition is free of VOC.

2. The composition of claim 1, wherein said dicyclopentadiene modified oil is dicyclopentadiene modified linseed oil.

3. The composition of claim 1, wherein said oil is selected from the group consisting of linseed oil, tung oil, perilla oil, soya oil, fish oil, otitica oil, sunflower oil, safflower oil, dehydrated castor oil, and combinations of the foregoing.

4. The composition of claim 1, wherein a solids content of the oleoresin is about 90 wt. % to about 100 wt. % total solids.

5. The composition of claim 1, wherein a solids content of the oleoresin component is about 75 wt. % to about 100 wt. % total solids.

6. The composition of claim 1, wherein a solids content of the oleoresin is about 50 wt. % to about 100 wt. % total solids.

7. The composition of claim 1, further comprising a solvent selected from the group consisting of tert-butyl acetate, a cyclic siloxane, 2-chlorobenzotrifluoride, and combinations of the foregoing.

8. The composition of claim 1, further comprising a material selected from the group consisting of leveling agents, drying agents, fillers, film forming agents, agents that absorb, block, or filter ultraviolet radiation, stabilizers, preservatives, surfactants, thickening agents, and combinations of the foregoing.

9. The composition of claim 1, further comprising a material selected from the group consisting of dyes, resins, pigments, and combinations of the foregoing.

10. An article of architectural lumber comprising a product of the composition of claim 1.

11. The article of claim 10, wherein said composition is applied by at least one of brushing, rolling, spraying, roller coating, curtain coating, and dipping.

12. An article of architectural lumber, comprising:
    a substrate comprising wood; and
    a product of a composition disposed on said substrate, said composition comprising,
        dicyclopentadiene modified oil comprising a reaction product of cyclopentadiene monomers and unsaturated sites of an oil, and
        an oleoresin selected from the group consisting of benzofuran, maleic anhydride, maleic acid, and combinations of the foregoing,
    wherein said composition is free of VOC.

13. The article of claim 12, wherein said composition forms a film on said wood substrate.

14. The article of claim 12, wherein said dicyclopentadiene modified oil is dicyclopentadiene modified linseed oil.

15. The article of claim 12, wherein said dicyclopentadiene modified oil comprises an oil selected from the group consisting of linseed oil, tung oil, perilla oil, soya oil, fish oil, otitica oil, sunflower oil, safflower oil, dehydrated castor oil, and combinations of the foregoing.

16. The article of claim 12, wherein said composition further comprises a material selected from the group consisting of leveling agents, drying agents, fillers, film forming agents, agents that absorb, block, or filter ultraviolet radiation, stabilizers, preservatives, surfactants, thickening agents, and combinations of the foregoing.

17. The article of claim 12, wherein said composition further comprises a material selected from the group consisting of dyes, resins, pigments, and combinations of the foregoing.

18. The article of claim 12, wherein a high solids content of said composition about 50 wt. % to about 100 wt. % total solids.

19. The article of claim 12, further comprising a solvent selected from the group consisting of tert-butyl acetate, a cyclic siloxane, 2-chlorobenzotrifluoride, and combinations of the foregoing.

20. A method of coating an article of architectural lumber, said method comprising the steps of:
    applying a composition comprising a dicyclopentadiene modified linseed oil and an oleoresin selected from the group consisting of benzofuran, maleic anhydride, maleic acid, and combinations of the foregoing, and being free of VOC to said article of architectural lumber using pumping and atomizing equipment; and
    allowing said composition to dry into a hardened film on said article of architectural lumber.

21. The method of claim 20, further comprising a step of preparing said composition that comprises incorporating a material selected from the group consisting of leveling agents, drying agents, fillers, film forming agents, agents that absorb, block, or filter ultraviolet radiation, stabilizers, preservatives, surfactants, thickening agents, and combinations of the foregoing into said composition.

22. The method of claim 20, further comprising the step of removing an excess amount of composition from said article of architectural lumber.

23. The method of claim 20, further comprising applying a topcoat over said composition applied to said article of architectural lumber.

24. The composition of claim 1, wherein the oleoresin is benzofuran.

25. The composition of claim 12, wherein the oleoresin is benzofuran.

26. A composition for coating a building material, said composition consisting of:
    a dicyclopentadiene modified linseed oil; and
    an oleoresin selected from the group consisting of benzofuran, maleic anhydride, maleic acid, and combinations of the foregoing,
    wherein said composition is free of VOC.

27. The composition of claim 26, wherein the oleoresin is benzofuran.

28. The composition of claim 26, wherein the oleoresin is maleic anhydride and a solids content of the oleoresin is about 90 wt. % to about 100 wt. % total solids.

* * * * *